(12) United States Patent
Brown et al.

(10) Patent No.: US 9,376,992 B2
(45) Date of Patent: *Jun. 28, 2016

(54) DUAL FUEL INJECTOR AND FUEL SYSTEM

(71) Applicant: Caterpillar, Inc., Peoria, IL (US)

(72) Inventors: Cory Andrew Brown, Peoria, IL (US); Dana R. Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/905,285

(22) Filed: May 30, 2013

(65) Prior Publication Data

US 2013/0319373 A1 Dec. 5, 2013

Related U.S. Application Data

(60) Provisional application No. 61/655,193, filed on Jun. 4, 2012.

(51) Int. Cl.
*F02M 43/04* (2006.01)
*F02M 21/02* (2006.01)

(52) U.S. Cl.
CPC .......... *F02M 43/04* (2013.01); *F02M 21/026* (2013.01); *F02M 21/0215* (2013.01); *F02M 21/0248* (2013.01); *F02M 21/0257* (2013.01); *F02M 21/0263* (2013.01); *F02M 21/0209* (2013.01); *F02M 21/0212* (2013.01); *F02M 21/0218* (2013.01); *F02M 21/0251* (2013.01); *F02M 21/0254* (2013.01); *F02M 2200/44* (2013.01)

(58) Field of Classification Search
CPC ....... F02M 43/04; F02M 21/00; F02M 21/02; F02M 21/0203; F02M 21/0206; F02M 21/0209; F02M 21/0212; F02M 21/0215; F02M 21/0218; F02M 21/0248; F02M 21/0251; F02M 21/0254; F02M 21/0257; F02M 21/026; F02M 21/0263; F02M 2200/44; F02M 61/18; F02M 61/1893; F02B 43/00; F02B 2043/103; F02D 19/06; F02D 19/08; F02D 41/0027
See application file for complete search history.

(56) References Cited

U.S. PATENT DOCUMENTS

| 4,687,136 A | 8/1987 | Ozu et al. |
| 4,700,672 A * | 10/1987 | Baguena ............ F02D 19/0684 123/299 |
| 5,890,459 A | 4/1999 | Hedrick |
| 5,996,558 A | 12/1999 | Ouellette et al. |
| 6,298,833 B1 | 10/2001 | Douville et al. |
| 6,422,199 B1 | 7/2002 | Buckley et al. |
| 7,124,959 B2 | 10/2006 | Baker et al. |
| 7,373,931 B2 * | 5/2008 | Lennox ............... F02D 19/0605 123/27 GE |
| 7,556,017 B2 * | 7/2009 | Gibson ................ F02M 47/027 123/299 |

(Continued)

*Primary Examiner* — Stephen K Cronin
*Assistant Examiner* — Kevin R Steckbauer

(57) ABSTRACT

A dual fuel injector in a dual common rail fuel system includes an injector body defining a liquid fuel supply passage to a liquid fuel nozzle outlet, and a gaseous fuel supply passage to a gaseous fuel nozzle outlet. A liquid fuel needle check is movable within the injector body and has an opening hydraulic surface exposed to a fuel pressure of a liquid fuel common rail. A gaseous fuel needle check is positioned side by side with the liquid fuel needle check and has an opening hydraulic surface exposed to the fuel pressure of the liquid fuel common rail. Sensitivity to differences in gaseous fuel rail pressure and liquid fuel rail pressure is reduced by the design.

14 Claims, 6 Drawing Sheets

(56) References Cited

U.S. PATENT DOCUMENTS

| | | |
|---|---|---|
| 7,891,579 B2 | 2/2011 | Mashida |
| 8,272,368 B2 * | 9/2012 | Wickstone .............. F02D 19/08 123/468 |
| 8,311,723 B2 * | 11/2012 | McAlister ................. F02B 3/06 123/297 |
| 8,459,576 B2 * | 6/2013 | Kim .................... F02D 19/0647 123/299 |
| 2014/0311455 A1 * | 10/2014 | Kim ....................... F02M 43/04 123/472 |

* cited by examiner

DUAL FUEL INJECTOR AND FUEL SYSTEM

RELATION TO OTHER PATENT APPLICATION

This application claims priority to provisional patent application 61/655,193, filed Jun. 4, 2012 with the same title.

TECHNICAL FIELD

The present disclosure relates generally to a dual fuel system where a liquid fuel and a gaseous fuel are injected into a combustion space of an engine in an engine cycle, and relates more particularly to controlling opening and closing of a gaseous fuel needle check in a fuel injector via pressure of a liquid fuel.

BACKGROUND

Gaseous fuel engines are known for their ability to burn clean relative to liquid fuel compression ignition engine counterparts. Gaseous fuels, however, are also well known for difficulty in attaining successful ignition. Some gaseous fuel engines utilize a spark plug, whereas other gaseous fuel engines utilize a small amount of a pilot fuel such as distillate diesel fuel, compression ignited to initiate combustion of a larger main charge of gaseous fuel such as natural gas. In these latter engines, the gaseous fuel may be supplied to the engine intake manifold, or metered directly into individual cylinders, where is it mixed with air prior to being ignited responsive to the pilot diesel injection.

In many dual fuel engine systems, injection of the liquid fuel and gaseous fuel is controlled by two separate needle checks within a fuel injector connected to both gaseous fuel and liquid fuel common rails. Designs are well known where concentric needle checks are used, with one of an inner check and an outer check used to open and close a gaseous fuel outlet, and the other of the inner and outer check used to open and close a liquid fuel outlet. In other systems, adjacent rather than coaxial needle checks are used. One known adjacent needle check design employs hydraulic control pressure from a liquid fuel common rail applied to a top end of each of the needle checks opposite the working tip which controls opening and closing of the corresponding nozzle outlet. Rail pressure is also applied to an opening hydraulic surface of the check controlling liquid fuel injection, such that selectively reducing and restoring the control pressure allows the check to open and close. In the case of the check controlling gaseous fuel injection, a pressure of the gaseous fuel common rail is applied to a primary opening hydraulic surface of the check. The gaseous fuel check is thus controlled via both liquid pressure and gas pressure, from two independent sources. Such a design has shown promise, but there is always room for improvement.

SUMMARY

In one aspect, a dual fuel injector includes an injector body defining a liquid fuel inlet, a liquid fuel nozzle outlet, and a liquid fuel supply passage to supply a pressurized liquid fuel from the liquid fuel inlet to the nozzle outlet at a first fuel pressure. The injector body further defines a gaseous fuel inlet, a gaseous fuel nozzle outlet, and a gaseous fuel supply passage to supply a pressurized gaseous fuel from the gaseous fuel inlet to the nozzle outlet at a second fuel pressure different from the first fuel pressure. The injector body further defines a first and a second check control chamber in fluid communication with the liquid fuel inlet, and a low pressure space. The dual fuel injector further includes a liquid fuel needle check movable within the injector body to open and close the liquid fuel nozzle outlet, and having a closing hydraulic surface exposed to a fluid pressure of the first check control chamber, and an opening hydraulic surface exposed to the first fuel pressure of the liquid fuel supply passage. The dual fuel injector further includes a gaseous fuel needle check positioned side-by-side with the liquid fuel needle check and movable within the injector body to open and close the gaseous fuel nozzle outlet, the gaseous fuel needle check having a closing hydraulic surface exposed to a fluid pressure of the first check control chamber, and an opening hydraulic surface exposed to the first fuel pressure of the liquid fuel supply passage. The dual fuel injector still further includes a liquid fuel injection control valve and a gaseous fuel injection control valve positioned fluidly between the first and second check control chambers, respectively, and the low pressure space.

In another aspect, a fuel system includes a liquid fuel supply including a liquid pressurizing mechanism and a liquid fuel common rail, and a gaseous fuel supply including a gas pressurizing mechanism and a gaseous fuel common rail. The fuel system further includes a dual fuel injector coupled with each of the liquid fuel and gaseous fuel common rails and including an injector body defining a liquid fuel outlet, a gaseous fuel outlet, a first and a second check control chamber in fluid communication with the liquid fuel common rail, and a low pressure space. The dual fuel injector further includes a liquid fuel needle check movable within the injector body to open and close fluid communications between the liquid fuel outlet and the liquid fuel common rail, and a gaseous fuel needle check position side by side with the liquid fuel needle check and movable within the injector body to open and close fluid communication between the gaseous fuel outlet and the gaseous fuel common rail. The liquid fuel and gaseous fuel needle checks each having a closing hydraulic surface exposed to a fluid pressure of the first and second check control chambers, respectively, and an opening hydraulic surface exposed to a fuel pressure of the liquid fuel common rail. The dual fuel injector further includes a liquid fuel injection control valve and a gaseous fuel injection control valve positioned fluidly between the first and second check control chambers, respectively, and the low pressure space.

DETAILED DESCRIPTION

Figure 1:
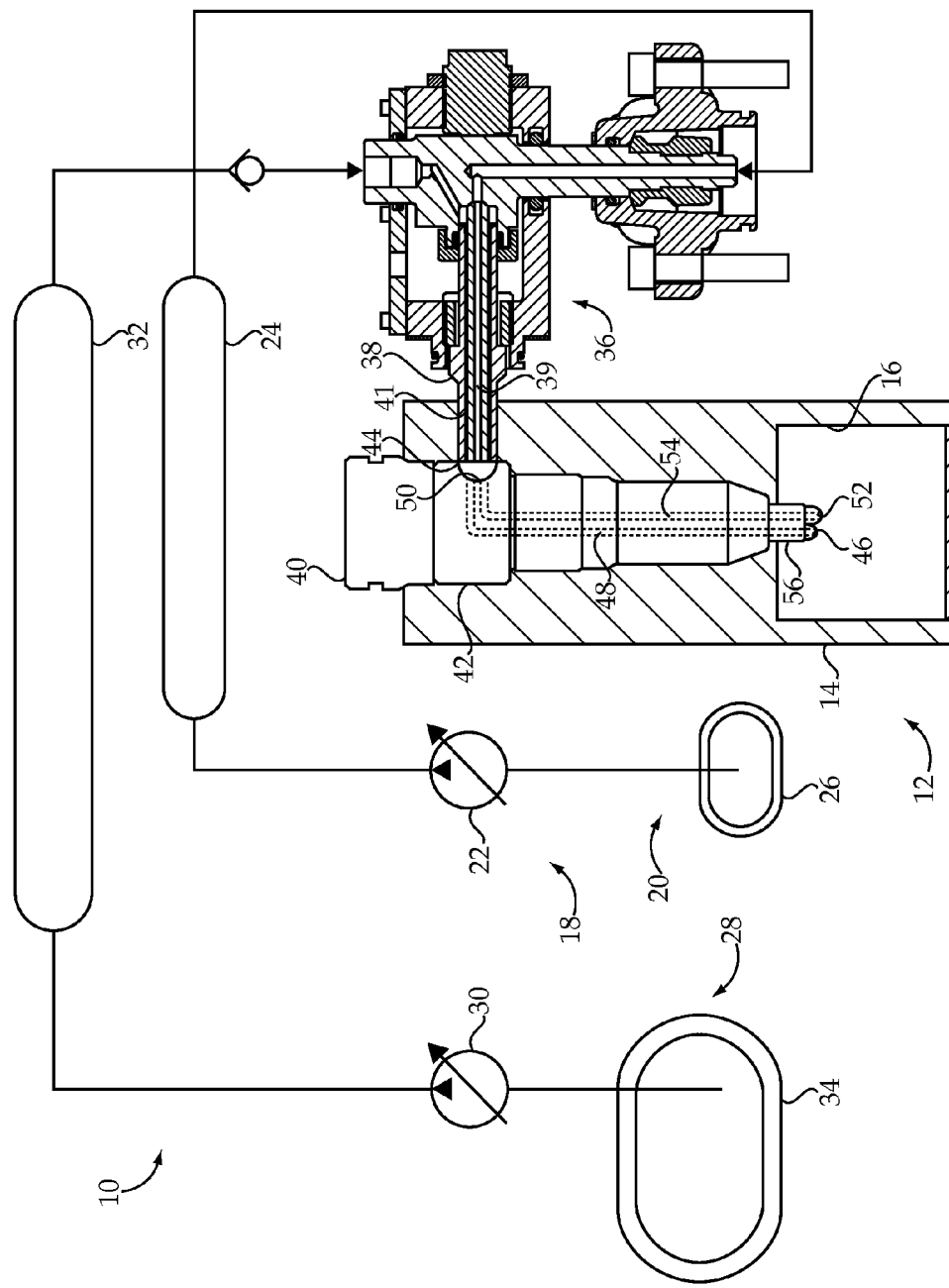
FIG. 1 is a diagrammatic view of an engine system according to one embodiment.

Referring to FIG. 1, there is shown an engine system 10 including a compression ignition diesel engine 12, according to one embodiment. Engine 12 includes a housing 14 having a cylinder 16 therein, and will typically include a plurality of such cylinders although only one is shown. Engine system 10 further includes a dual fuel system 18 having a liquid fuel supply 20 and a gaseous fuel supply 28. Liquid fuel supply 20 may include a pressurizing mechanism 22 such as a pump fluidly connected with a tank 26 and configured to pressurize liquid fuel, such as petroleum distillate diesel fuel, from tank 26, and convey the same to a liquid fuel common rail 24. Gaseous fuel supply 28 may also include a tank 34, for example storing a liquefied gaseous fuel such as natural gas, and a pressurizing mechanism 30 configured to pressurize the gaseous fuel and supply the same to a gaseous fuel common rail 32. A mechanism for converting the stored liquefied gaseous fuel to a gaseous form, and a pressure regulator (neither shown) may also be provided. A low pressure fuel transfer pump or the like may be interposed tank 26 and mechanism 22. Various parts of system 10 may be electronically controlled, such as mechanisms 22 and 30, and a conventional electronic control module along with various sensors and communication lines might be used to vary an output of mechanisms 22 and 30 to control fuel pressures within common rails 24 and 32.

Fuel system 18 may further include a dual fuel injector 40 coupled with engine housing 14, and having an injector body 42 including a nozzle tip piece 56 extending into cylinder 16. Injector body 42 may define a liquid fuel inlet 44, a liquid fuel nozzle outlet 46, and a liquid fuel supply passage 48 to supply pressurized liquid fuel from inlet 44 to nozzle outlet 46 at a first fuel pressure, namely, a fuel pressure in common rail 24. Injector body 42 may further define a gaseous fuel inlet 50, a gaseous fuel nozzle outlet 52, and a gaseous fuel supply passage 54 to supply a pressurized gaseous fuel from inlet 50 to nozzle outlet 52 at a second fuel pressure different from the first fuel pressure, namely a fuel pressure in common rail 32. The first fuel pressure may be higher than the second fuel pressure in most instances. Each of nozzle outlets 46 and 52 may include a plurality of spray orifices formed in tip piece 56, and nozzle outlets 46 and 52 may be vertically offset from one another in cylinder 16 as shown. A variety of internal components of fuel injector 40, which may be electronically controlled, are used to control the opening and closing of outlets 46 and 52 in a manner further described herein. Fuel system 18 may further include a fuel connector 36 configured to fluidly connect common rails 24 and 32 with fuel injector 40, and in a practical implementation strategy may include a co-axial quill connector 38 having a first fluid conduit 39 fluidly connecting inlet 44 with common rail 24, and a second fluid conduit 41 fluidly connecting inlet 50 with common rail 32. As noted above, engine 12 may include a plurality of cylinders, and it will thus be readily apparent that engine 12 may also include a plurality of dual fuel injectors, associated one with each of the plurality of cylinders, and each having a fuel connector similar to connector 36 which may have a design known in the art. Although a co-axial quill strategy is contemplated to have certain advantages, particularly with regard to packaging, the present disclosure is not thereby limited and separate fluid connectors might be used between each of common rails 24 and 32 and injector 40 in other embodiments.

Figure 2:
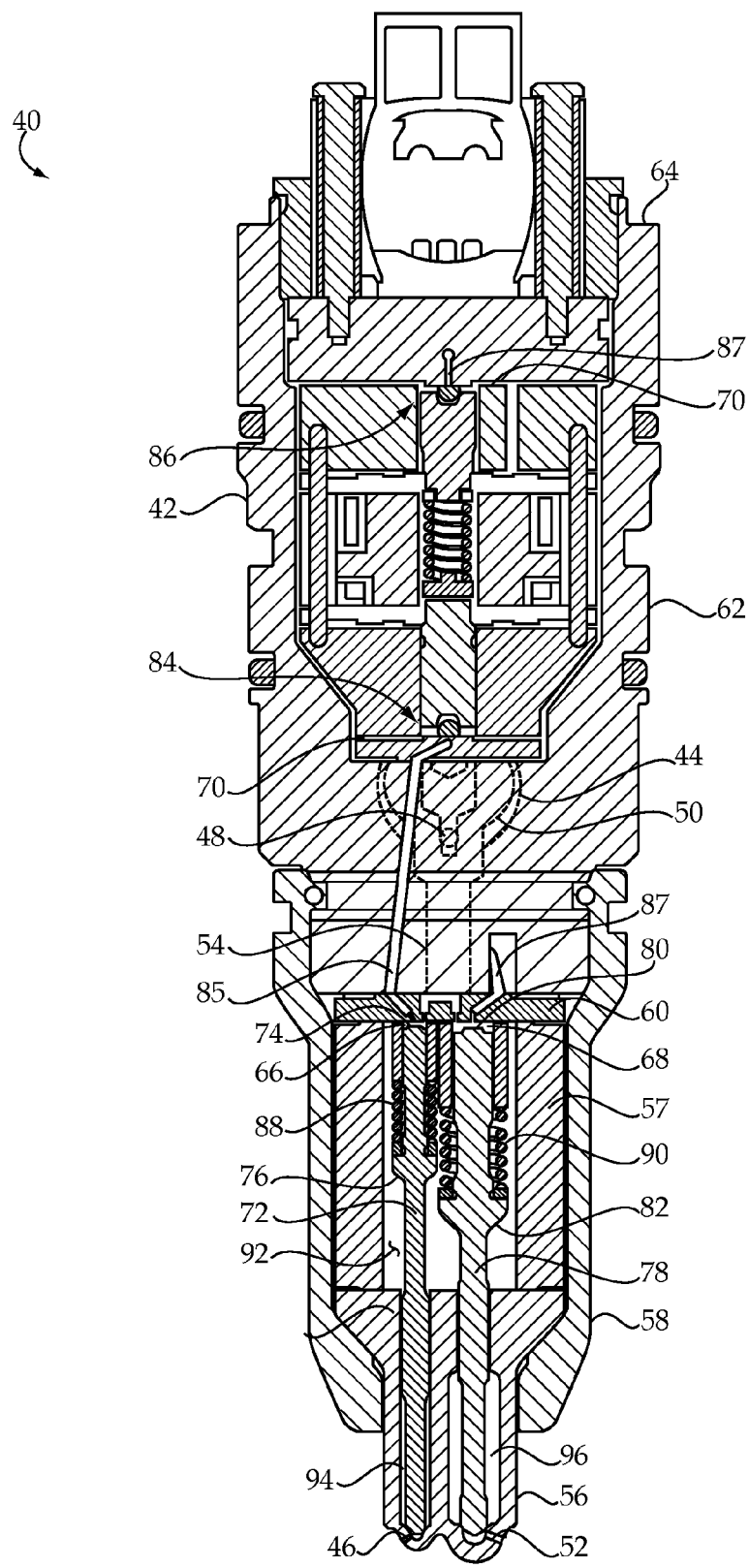
FIG. 2 is a sectioned side diagrammatic view of a dual fuel injector, according to one embodiment.

Referring also now to FIG. 2, there are shown additional details of fuel injector 40. Injector body 42 may include a plurality of body pieces, of which tip piece 56 is one. Tip piece 56 may be positioned within an outer body piece 58, attached to an upper body piece or clamping body piece 62. Upper body piece 62 may be threadedly coupled with body piece 58, and rotated to clamp together internal components of injector 40. Dowels or any other suitable strategy may be used to align the internal components of injector 40 during assembly to obtain the desired fluid connections further discussed herein. Injector body 42 may also include an inner body piece 57 and an orifice plate 60, clamped between body piece 62 and tip piece 56. Injector body 42 further defines a first check control chamber 66 and a second check control chamber 68, each in fluid communication with liquid fuel inlet 44. Injector body 42 further defines a low pressure space 70. Low pressure space 70 may be comprised of any combination or configuration of outlets, spaces, clearances between components, or leak paths, so long as a pressure gradient from check control chambers 66 and 68 to the low pressure space can be established to enable fuel injection control. Injector 40 may also include a liquid fuel needle check 72 movable within injector body 42 to open and close liquid fuel nozzle outlet 46. Check 72 has a closing hydraulic surface 74 exposed to a fluid pressure of first check control chamber 66, and further has an opening hydraulic surface 76 exposed to the first fuel pressure of liquid fuel supply passage 48. In the FIG. 2 illustration, liquid fuel supply passage 48 is partially hidden from view, however, it will be understood by those skilled in the art that the passage extends through the components positioned between inlet 44 and outlet 46 to supply liquid fuel for injection. Injector 40 further includes a gaseous fuel needle check 78 positioned side-by-side, and typically parallel with needle check 72, and movable within injector body 42 to open and close nozzle outlet 52. Needle check 78 has a closing hydraulic surface 80 exposed to a fluid pressure of check control chamber 68 and an opening hydraulic surface 82 exposed to the first fuel pressure of liquid fuel supply passage 48. Needle check 78 may also have opening gas pressure surfaces exposed to a gas pressure of gaseous fuel supply passage 54, but in all contemplated embodiments will be urged open based at least in part on hydraulic pressure. Area/size ratios between one or more opening hydraulic surfaces 82 and any opening gas pressure surfaces may be optimized for performance, also giving consideration to an area/size of closing hydraulic surface 80. Given the teachings set forth herein, those skilled in the art will recognize many alterations and optimizations made possible by varying the relative areas/sizes and placement of surfaces exposed or capable of being exposed to hydraulic or gas pressures.

Injector 40 further includes a liquid fuel injection control valve 84 and a gaseous fuel injection control valve 86, positioned fluidly between first and second check control chambers 66 and 68, respectively, and low pressure space 70. In the illustrated embodiment, each of control valves 84 and 86 is part of an electrically actuated control valve assembly, having at least one valve member, an armature, and a solenoid. A first drain passage 85 fluidly connects check control chamber 66 with control valve 84, which is actuated to reduce a pressure in check control chamber 66 such that a closing hydraulic force acting on closing hydraulic surface 74 is reduced, enabling the fuel pressure of liquid fuel supply passage 48, via opening hydraulic surface 76, to lift check 72 and open outlet 46. Another drain passage 87 fluidly connects check control chamber 68 to control valve 86 to enable opening of needle check 78 to inject gaseous fuel via outlet 52. In contrast to certain known dual fuel strategies, hydraulic pressure, as opposed to gas pressure, acts on an opening hydraulic surface of both the liquid fuel and gaseous fuel needle checks, the significance of which will be further apparent from the following description. To end injection, control valves 84 and 86 may be deactivated, either energized or de-energized as the case may be, to restore the fluid pressure in chambers 66 or 68 to rail pressure. Control valves 84 and 86 might be of any suitable configuration and could each include a 2-way valve as shown, a 3-way valve, or still another strategy. In a practical implementation strategy, injector 40 further includes a first spring 88 biasing needle check 72 closed, sealing outlet 46, and a second spring 90 biasing needle check 78 closed to seal outlet 52. Opening of needle checks 72 or 78 may occur in opposition to a bias of the corresponding spring. Closing of needle checks 72 and 78 may occur in opposition to fluid pressures opposing the closing pressure provided in control chambers 66 and 68. In the case of check 78, gas pressure may be acting on the tip, in opposition to the closing pressure in control chamber 68.

It will be recalled that opening hydraulic surfaces 76 and 82 may be exposed to the fuel pressure of liquid fuel supply passage 48, typically equal to fuel pressure in common rail 24. In the embodiment shown, checks 72 and 78 are each positioned partially within a chamber 92 forming a segment of liquid fuel supply passage 48. Chamber 92 may have first and second springs 88 and 90 positioned therein, and thus may be understood as a spring chamber. Opening hydraulic surfaces 76 and 82 may thus be exposed to the fuel pressure within spring chamber 92. In alternative embodiments, multiple spring chambers or some other strategy for supplying rail pressure to the opening hydraulic surfaces might be used.

Figure 3:
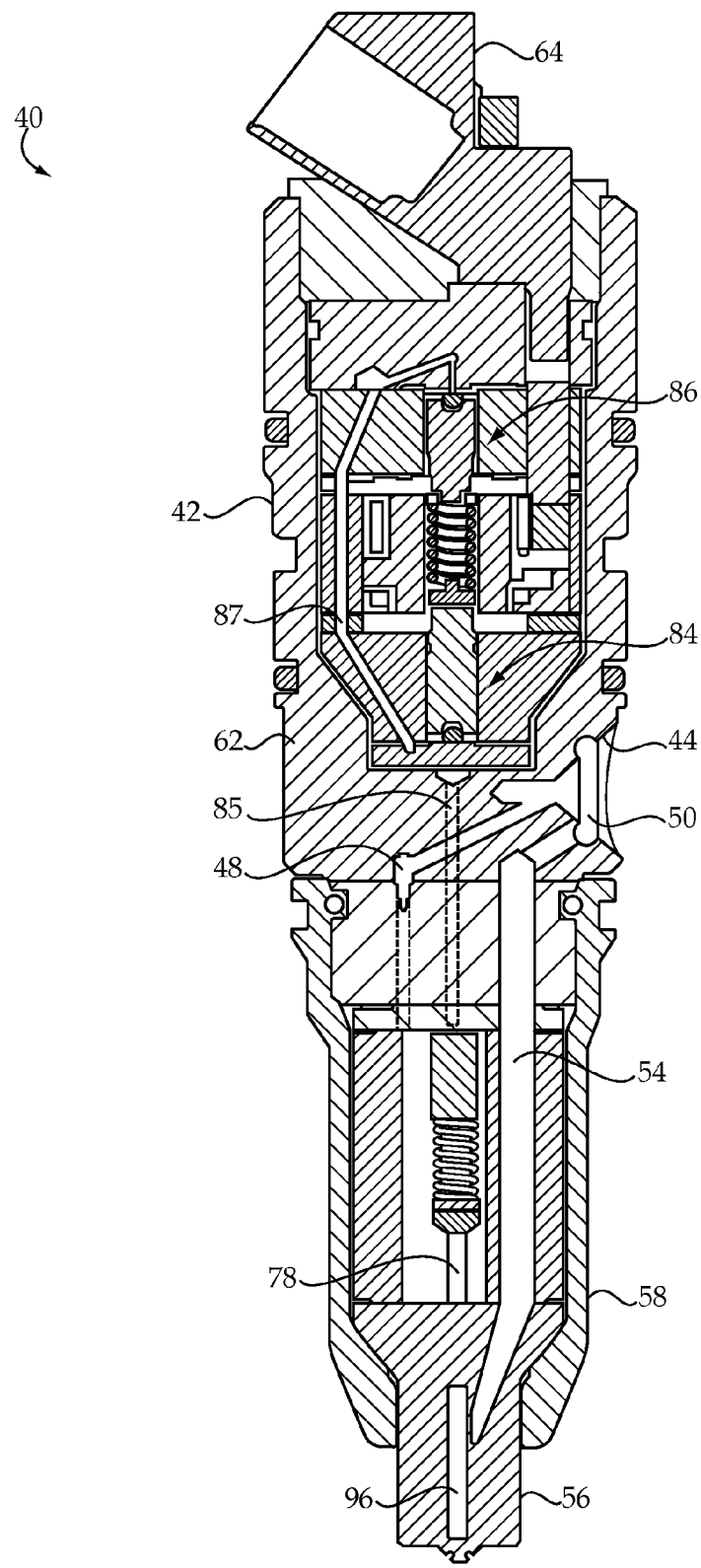
FIG. 3 is a sectioned side diagrammatic view of the dual fuel injector of FIG. 2, in a different section plane.

Referring also now to FIG. 3, there is shown a different sectioned view of injector 40, in which gaseous fuel supply passage 54 is shown extending from inlet 50 to a gas cavity 96 formed in tip piece 56. In a practical implementation strategy, gas cavity 96 may be of a larger volume, and is fluidly connected to gaseous fuel supply passage 54, and fluidly connected to outlet 52 when check 78 is opened. Tip piece 56 may further define a liquid cavity 94 of a smaller volume, fluidly connected to liquid supply passage 48, and fluidly connected to outlet 46 when check 72 is opened.

Figure 4:
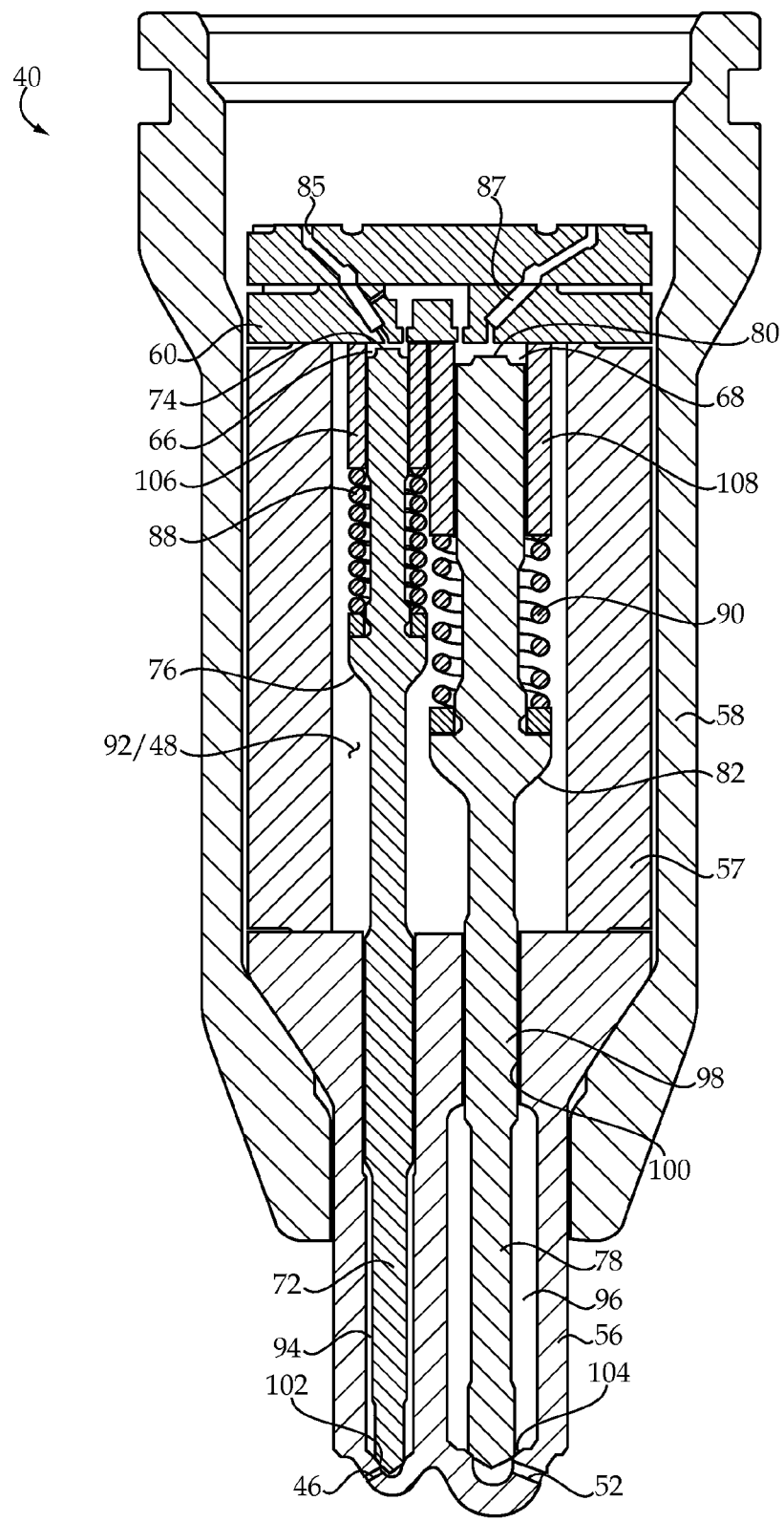
FIG. 4 is a sectioned side diagrammatic view of a portion of the dual fuel injector of FIGS. 2 and 3.

Referring also now to FIG. 4, there is shown an enlarged view of a portion of injector 40. As noted above, chamber 92 forms a segment of liquid fuel supply passage 48, and thus can convey liquid fuel from inlet 44 to liquid fuel cavity 94 past a clearance between check 72 and tip piece 56. Check 72 may be shaped to form grooves for the flow of fuel past the portion of check 72 within tip piece 56. Gas cavity 96, however, will typically be blocked from substantial fluid communication with chamber 92. To this end, check 78 may include a guide segment 98 having a match clearance with a bore 100 formed in tip piece 56, such that liquid fuel intruding into the match clearance from chamber 92 prevents migration of gaseous fuel from gas cavity 96 to chamber 92. This will tend to be the case because a fuel pressure in common rail 24 will typically be slightly higher than a fuel pressure in common rail 32, at least on average and as specified, and thus a pressure of liquid fuel in chamber 92 will tend to prevent gaseous fuel from traveling up through the match clearance into chamber 92. A minor fluid leakage which will tend to occur will be a leakage of liquid fuel downward through the match clearance from chamber 92 into gas cavity 96, lubricating check 78 within bore 100 and lubricating seat 104. A high pressure seal, such as a sealing annulus fluidly connected to liquid supply passage 48, near the bottom of bore 100 might alternatively be provided to prevent upward gas leakage flow.

Also shown in FIG. 4 are a first cylindrical sleeve 106 positioned at least partially within chamber 92 and receiving check 72 therein. A second cylindrical sleeve 108 is also positioned at least partially within chamber 92 and receives check 78 therein. Clearances between checks 72 and 78 and sleeves 106 and 108 may be match clearances, or close to match clearances. Orifice plate 60 abuts each of first and second sleeves 106 and 108. Check control chamber 66 may be defined in part by each of first sleeve 106, check 72 and orifice plate 60, whereas check control chamber 68 may be defined in part by each of second sleeve 108, check 78 and orifice plate 60. Each of first and second sleeves 106 and 108 may be a floating sleeve, meaning not physically attached to other components, biased into contact with orifice plate 60 via first and second springs 88 and 90, respectively. Alternative designs are contemplated where only one of checks 72 and 78 is paired with a sleeve, such as only check 78. It may further be noted that each of checks 72 and 78 may include a one-piece needle check, although the present disclosure is not thusly limited.

Figure 5:
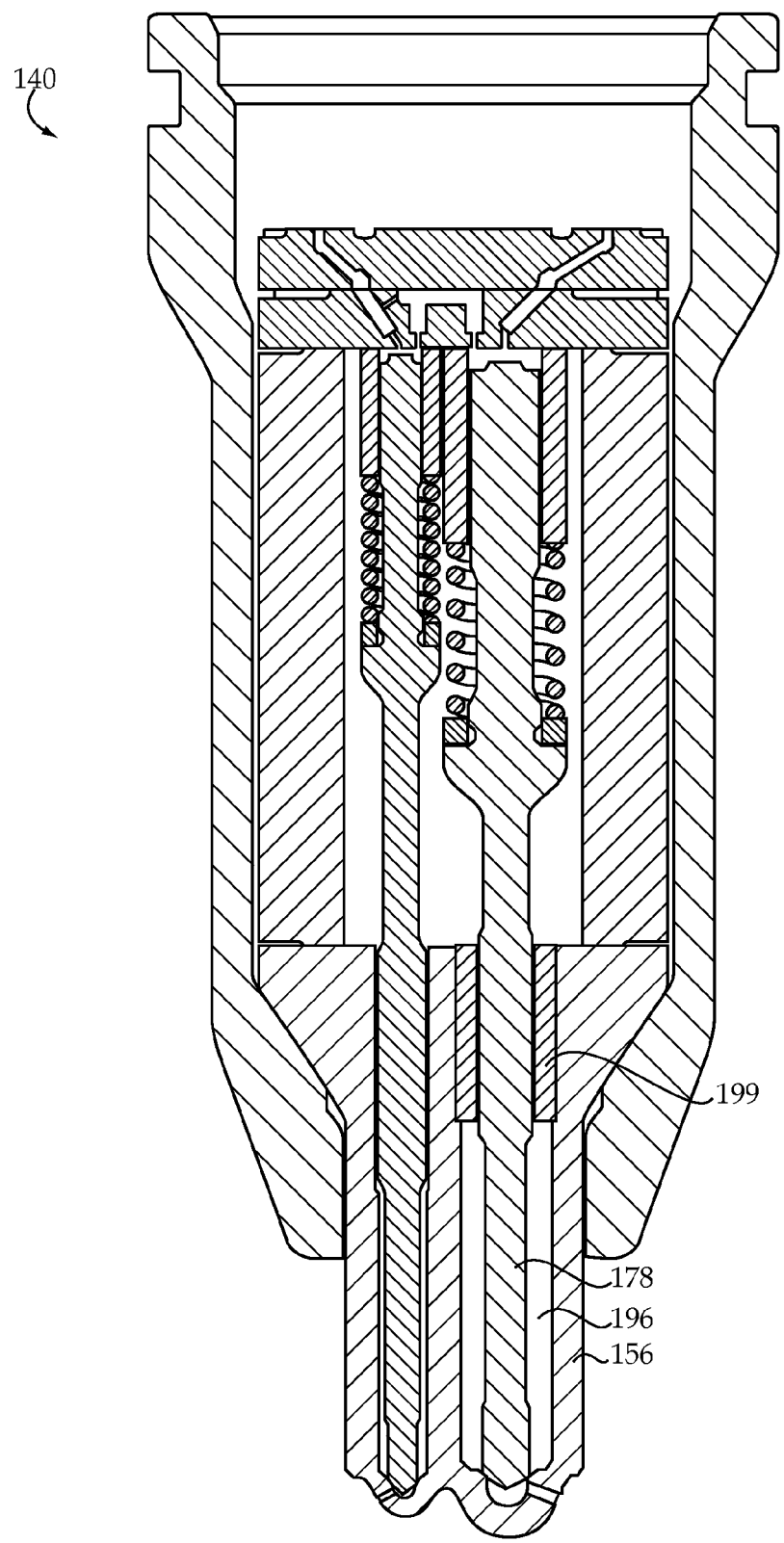
FIG. 5 is a sectioned side diagrammatic view of a dual fuel injector, according to another embodiment.

Referring now to FIG. 5, there is shown a dual fuel injector 140 according to another embodiment. Injector 140 may function generally analogously to injector 40, but has certain structural differences. Injector 140 includes a tip piece 156, a gaseous fuel needle check 178, and an insert 199 positioned within tip piece 156, such that a gas cavity 196 is defined in part by insert 199, in part by tip piece 156, and in part by check 178. Insert 199 may be interference fit into tip piece 156, and has a match clearance with check 178 providing for the prevention of migration of gaseous fuel upward through the clearance in a manner analogous to injector 40, and also analogously enabling lubrication of check 178. Referring back to FIG. 4, it may be noted that a shape of gas cavity 96 may be such that gas cavity 96 is generally oblong and larger in diameter than bore 100. In a practical implementation strategy, gas cavity 96 might be suitably shaped via electrochemical machining, but where such a technique is not considered viable such as due to cost, insert 199 might be used to obtain a gas cavity of appropriate size and shape to enable suitably rapid injection of an appropriate quantity of gaseous fuel.

Figure 6:
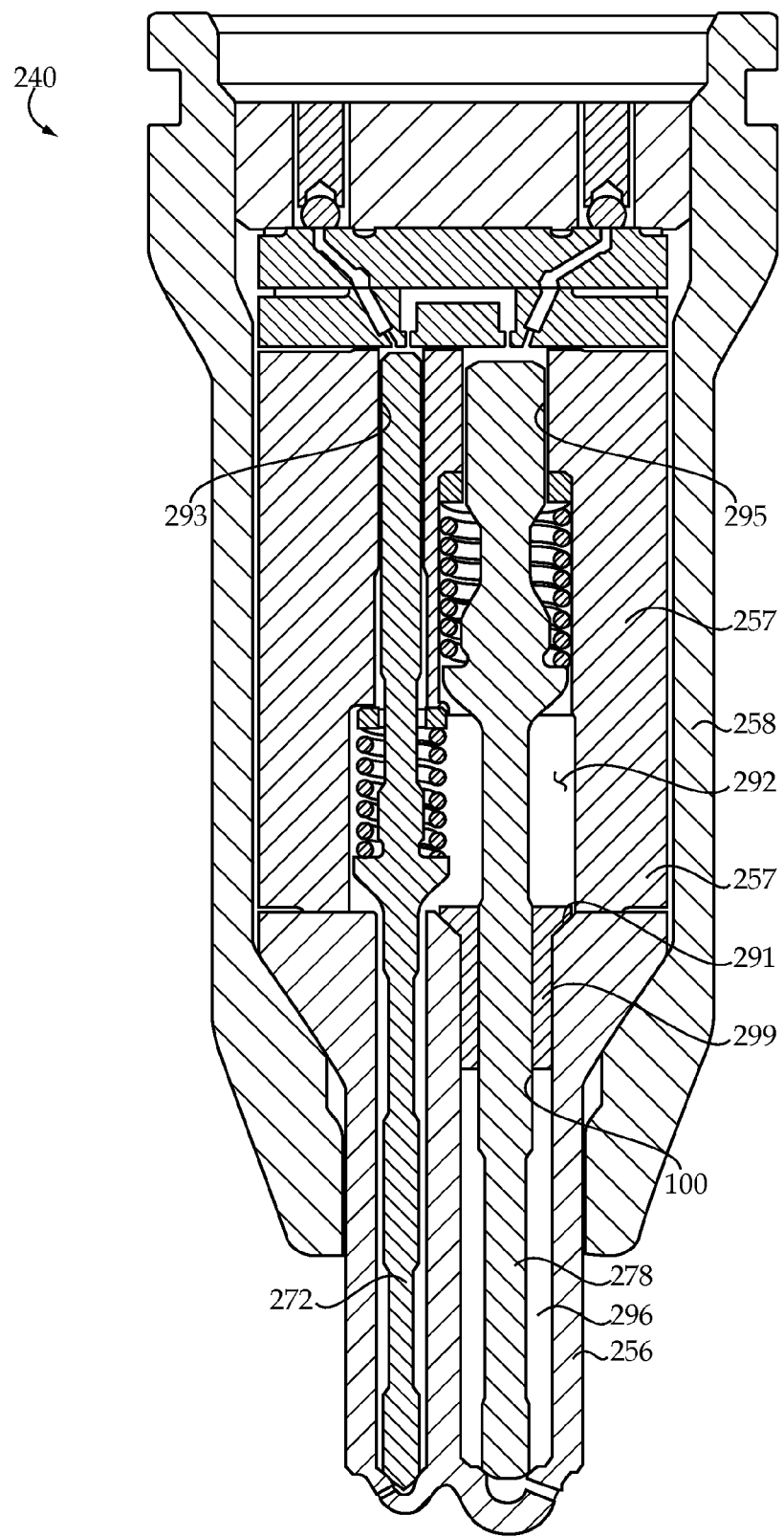
FIG. 6 is a sectioned side diagrammatic view of a dual fuel injector, according to yet another embodiment.

Referring now to FIG. 6, there is shown a fuel injector 240 according to yet another embodiment, having a tip piece 256 positioned within an outer body piece 258, and having an inner body piece 257 positioned within outer body piece 258 and clamped against tip piece 256. Injector 240 functions similarly to the foregoing embodiments, but has certain structural differences. Injector 240 differs from the previously described embodiments in that a first bore 293 in inner body piece 257 receives and guides a liquid fuel needle check 272, whereas a second bore 295 in inner body piece 257 receives a gaseous fuel needle check 278, rather than the use of floating sleeves or the like. A combination of one bore for one of checks 272 and 278, and one floating sleeve for the other, might be used alternatives to any of the embodiments contemplated herein. Check control chambers are defined in part by inner body piece 257, in part by checks 272 and 278, respectively, and in part by an orifice plate (not numbered).

Injector 240 also differs from the embodiments described above, in that an insert 299 is provided, but rather than being a cylindrical insert such as the insert shown in injector 140 of FIG. 5, insert 299 includes a conical external shape which forms a conical seal 291 with tip piece 256. A flat seat design might be used instead of a conical shape in other versions. Liquid fuel pressure in a chamber 292 will tend to urge insert 299 downward to form seal 291. Insert 299 may have a match clearance with needle check 278 to guide the same, and provide for lubrication and gas sealing as in other embodiments. In alternative embodiments, an insert shaped similarly to insert 299 might be used, but oriented 180° differently from that shown in the FIG. 6 embodiment. In such a design, the insert may be positioned wholly within chamber 292 and form a knife edge seal or the like against tip piece 256, again the seal being formed or at least enhanced by fuel pressure in chamber 292 and possibly an additional biasing spring positioned between the insert and the bottom of the check spring land.

INDUSTRIAL APPLICABILITY

As noted above, certain known dual fuel common rail engine systems utilize fuel injectors in which a gaseous fuel needle check is opened via a pressure of gaseous fuel acting upon a surface of the gaseous fuel needle check, in particular lifting the needle check when a hydraulic control pressure on a closing hydraulic surface of the needle check is reduced. While such systems may perform acceptably much of the time, separate control of the gaseous fuel and liquid fuel common rails can introduce some variability and unpredictability into the system. Common rail fuel systems in general tend to be fairly dynamic, with rail pressures dropping in response to injection events, increasing in pressure as fuel pressurization mechanisms operate to replenish fuel consumed, and varying as injection timing and duration are modulated. Where dual common rails are used, such changes in pressure can affect the balance of forces acting on a needle check, particularly where liquid fuel rail pressure is used to supply a closing force to one side of the check, and gaseous fuel pressure used to supply an opening force to the other side of the check. Engineers generally use the term ΔP in reference to a difference between the two rail pressures. ΔP may be relatively large in some instances, and relatively small or perhaps even temporarily zero in other instances, but can have the generally undesirable effect of introducing uncertainty into the opening and closing timings and speed of a needle check. As a result, in dual fuel common rail systems where the needle check is lifted primarily via the pressure of gaseous fuel and closed primarily via the pressure of liquid fuel, an amount of injected fuel may vary from a specified amount, and overall the injection amount may be relatively sensitive to variations in pressure between and within one or both of the common rails.

The present disclosure addresses these and other concerns by way of controlling opening and closing of a gaseous fuel needle check in a dual fuel injector primarily via hydraulic pressure from only the liquid fuel common rail. In FIG. 2, injector 40 is shown as it might appear just prior to commencing fuel injection, in a four-stroke engine cycle for example. Each of checks 72 and 78 is in a closed position blocking the corresponding fuel outlet, and biased to the closed position via corresponding springs 88 and 90, and also potentially via rail pressure prevailing in control chambers 66 and 68, if checks 72 and 78 are not designed to be hydraulically balanced. When it is desirable to commence fuel injection in the engine cycle, such as where a piston in cylinder 16 is approaching a top dead center position in a compression stroke, injection control valve 84 may be activated, energized or de-energized, to fluidly connect control chamber 66 with low pressure space 70 via passage 85. The hydraulic pressure in chamber 66 will tend to rapidly decrease, with fuel flowing from chamber 66 into passage 85, and enabling rail pressure in chamber 92 via hydraulic surface 76 to lift check 72 and open outlet 46. The injection of liquid fuel may be of relatively small quantity, in other words energy content, serving as a pilot injection. Valve 84 may then be deactivated to block passage 85 from low pressure space 70, and thus allow chamber 66 to return to rail pressure and check 72 to close.

During the same engine cycle, and typically still prior to the piston reaching a top dead center position, but not necessarily, valve 86 may be activated to fluidly connect control chamber 68 to low pressure space 70 via passage 87, reducing the pressure therein and enabling rail pressure in chamber 92, via hydraulic surface 82, to lift check 78 and open outlet 52. The gaseous fuel injection may be of a relatively large quantity or energy content. When it is desirable to end gaseous fuel injection, valve 86 may be used to block chamber 68 from low pressure space 70, thus restoring rail pressure in chamber 68 and enabling check 78 to close outlet 52. It is contemplated that each of checks 72 and 78 might be hydraulically balanced, such that the closing force is provided at least predominantly by the corresponding spring, but either or both of checks could be hydraulically biased either open or closed for various purposes, without departing from the scope of the present disclosure.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while the foregoing embodiments are illustrated in the context of a spring chamber containing the biasing springs for the needle checks and also fuel at rail pressure, in other versions a hydraulic opening force might be provided to the gaseous fuel needle check via an annulus or the like formed in body piece 57, for example, and fluidly connected with the liquid fuel common rail rather than within a spring chamber. Other aspects, features and advantages will be apparent upon an examination of the attached drawings and appended claims.

What is claimed is:

1. A dual fuel injector comprising:
an injector body defining a liquid fuel inlet, a liquid fuel nozzle outlet, and a liquid fuel supply passage to supply a pressurized liquid fuel from the liquid fuel inlet to the liquid fuel nozzle outlet at a first fuel pressure, and the injector body further defining a gaseous fuel inlet, a gaseous fuel nozzle outlet, and a gaseous fuel supply passage to supply a pressurized gaseous fuel from the gaseous fuel inlet to the gaseous fuel nozzle outlet at a second fuel pressure different from the first fuel pressure;
the injector body further defining a first and a second check control chamber in fluid communication with the liquid fuel inlet, and a low pressure space;
a liquid fuel needle check movable within the injector body to open and close the liquid fuel nozzle outlet, and having a closing hydraulic surface exposed to a fluid pressure of the first check control chamber, and an opening hydraulic surface exposed to the first fuel pressure of the liquid fuel supply passage;
a first spring disposed around the liquid fuel needle check and positioned axially along the liquid fuel needle check between the first check control chamber and the opening hydraulic surface of the liquid fuel needle check;
a gaseous fuel needle check positioned side-by-side with the liquid fuel needle check and movable within the injector body to open and close the gaseous fuel nozzle outlet, the gaseous fuel needle check having a closing hydraulic surface exposed to a fluid pressure of the first check control chamber, and an opening hydraulic surface exposed to the first fuel pressure of the liquid fuel supply passage;
a second spring disposed around the gaseous fuel needle check and positioned axially along the gaseous fuel needle check between the first check control chamber and the opening hydraulic surface of the gaseous fuel needle check, wherein the first spring and the second spring are positioned side-by-side and axially off set; and
a liquid fuel injection control valve and a gaseous fuel injection control valve positioned fluidly between the first and second check control chambers, respectively, and the low pressure space, wherein the injector body further defines at least one spring chamber forming a segment of the liquid fuel supply passage and having the first and second springs disposed therein, wherein the injector body includes a tip piece having the liquid fuel and gaseous fuel nozzle outlets formed therein, the tip piece defining a liquid cavity and a gas cavity, and wherein the injector body has a match clearance with the gaseous fuel needle check such that liquid fuel intruding into the match clearance from the at least one spring chamber prevents migration of the gaseous fuel from the gas cavity to the at least one spring chamber.

2. The dual fuel injector of claim 1 wherein the first spring biases the liquid fuel needle check closed, and the second spring biases the gaseous fuel needle check closed.

3. The dual fuel injector of claim 2 wherein the opening hydraulic surfaces of the liquid fuel and gaseous fuel needle checks are exposed to the first fuel pressure within the at least one spring chamber.

4. The dual fuel injector of claim 3 wherein a volume of the liquid cavity of the tip piece is smaller than a volume of the gas cavity of the tip piece.

5. The dual fuel injector of claim 4 further comprising
a first sleeve positioned at least partially within the at least one spring chamber and receiving the liquid fuel needle check therein;
a second sleeve positioned at least partially within the at least one spring chamber and receiving the gaseous fuel needle check therein; and
an orifice plate abutting each of the first and second sleeves.

6. The dual fuel injector of claim 5 wherein the first check control chamber is defined in part by each of the first sleeve, the liquid fuel needle check, and the orifice plate, and
the second check control chamber is defined in part by each of the second sleeve, the gaseous fuel needle check, and the orifice plate.

7. The dual fuel injector of claim 6 wherein each of the first and second sleeves is a floating sleeve biased into contact with the orifice plate via the first and second springs, respectively.

8. The dual fuel injector of claim 1 wherein each of the liquid fuel and gaseous fuel needle checks includes a one-piece needle check.

9. A fuel system comprising:
a liquid fuel supply including a liquid pressurizing mechanism and a liquid fuel common rail;
a gaseous fuel supply including a gas pressurizing mechanism and a gaseous fuel common rail;
a dual fuel injector coupled with each of the liquid fuel and gaseous fuel common rails and including an injector body defining a liquid fuel outlet, a gaseous fuel outlet, a first and a second check control chamber in fluid communication with the liquid fuel common rail, and a low pressure space;
the dual fuel injector further including a liquid fuel needle check movable within the injector body to open and close fluid communications between the liquid fuel outlet and the liquid fuel common rail, and a gaseous fuel needle check positioned side-by-side with the liquid fuel needle check and movable within the injector body to open and close fluid communications between the gaseous fuel outlet and the gaseous fuel common rail; and the liquid fuel and gaseous fuel needle checks each having a closing hydraulic surface exposed to a fluid pressure of the first and second check control chambers, respectively, and an opening hydraulic surface exposed to a fuel pressure of the liquid fuel common rail;
a first spring disposed around the liquid fuel needle check and positioned axially along the liquid fuel needle check between the first check control chamber and the opening hydraulic surface of the liquid fuel needle check and a second spring disposed around the gaseous fuel needle check and positioned axially along the gaseous fuel needle check between the first check control chamber and the opening hydraulic surface of the gaseous fuel needle check, wherein the first spring and the second spring are positioned side-by-side and axially off set; and
the dual fuel injector further including a liquid fuel injection control valve and a gaseous fuel injection control valve positioned fluidly between the first and second check control chambers, respectively, and the low pressure space,
wherein the injector body further includes a tip piece having each of the liquid fuel and gaseous fuel outlets formed therein, the tip piece defining a gas cavity being fluidly connected to the gaseous fuel outlet when the gaseous fuel needle check opens the gaseous fuel outlet, and a liquid cavity being fluidly connected to the liquid fuel outlet when the liquid fuel outlet check opens the liquid fuel outlet,
wherein the injector body further defines a spring chamber, the first spring and the second spring being disposed within the spring chamber, and
wherein the gaseous fuel needle check extends through the tip piece and has a match clearance therewith, such that liquid fuel intruding into the match clearance from the spring chamber prevents migration of the gaseous fuel from the gas cavity to the spring chamber.

10. The fuel system of claim 9 wherein each of the liquid fuel and gaseous fuel needle checks is a one-piece needle check.

11. The fuel system of claim 9 wherein a volume of the liquid cavity is smaller than a volume of the gas cavity.

12. The fuel system of claim 11 wherein the first spring biases the liquid fuel needle check closed, and the second spring biases the gaseous fuel needle check closed, and
wherein each of the opening hydraulic surfaces is exposed to the fuel pressure of the liquid fuel common rail within the spring chamber.

13. The fuel system of claim 12 further comprising
a first floating sleeve positioned within the spring chamber and receiving the liquid fuel needle check; and
a second floating sleeve positioned within the spring chamber and receiving the gaseous fuel needle check,
wherein the first and second check control chambers are defined in part by the first and second floating sleeves, respectively.

14. The fuel system of claim 9 further comprising
a coaxial quill coupled with the injector body and having a gaseous fuel conduit fluidly connecting the fuel injector to the gaseous fuel common rail; and
a liquid fuel conduit fluidly connecting the fuel injector to the liquid fuel common rail.

* * * * *